US007856237B1

(12) United States Patent
Peter et al.

(10) Patent No.: US 7,856,237 B1
(45) Date of Patent: Dec. 21, 2010

(54) METHOD FOR TRANSMISSION OF LOCATION-SPECIFIC INFORMATION

(75) Inventors: Martin Peter, Munich (DE); Renate Maria Peter, legal representative, Munich (DE); Heribert Josef Peter, legal representative, Munich (DE); Joerg Siewerth, Hohenbrunn (DE)

(73) Assignee: Siemens Aktiengesellschaft, Munich (DE)

( * ) Notice: Subject to any disclaimer, the term of this patent is extended or adjusted under 35 U.S.C. 154(b) by 342 days.

(21) Appl. No.: 10/129,053

(22) PCT Filed: May 31, 2000

(86) PCT No.: PCT/DE00/01793

§ 371 (c)(1), (2), (4) Date: Sep. 26, 2002

(87) PCT Pub. No.: WO01/31619

PCT Pub. Date: May 3, 2001

(30) Foreign Application Priority Data

Oct. 28, 1999 (DE) ................................ 199 52 001

(51) Int. Cl.
*H04W 24/00* (2009.01)

(52) U.S. Cl. .............. 455/456.3; 455/456.1; 455/414.2; 455/500

(58) Field of Classification Search .............. 455/435.2, 455/456.3, 432, 500, 456.1, 455, 414, 7, 455/39, 414.2; 370/338, 66; 707/102, 100, 707/103
See application file for complete search history.

(56) References Cited

U.S. PATENT DOCUMENTS

| | | | | |
|---|---|---|---|---|
| 5,264,822 | A | 11/1993 | Vogelman et al. | |
| 5,519,706 | A * | 5/1996 | Bantz et al. | 455/435.2 |
| 5,834,857 | A * | 11/1998 | Abe et al. | 307/66 |
| 5,877,698 | A * | 3/1999 | Kusnier et al. | 340/5.92 |
| 6,078,575 | A * | 6/2000 | Dommety et al. | 370/338 |
| 6,256,498 | B1 * | 7/2001 | Ludwig | 455/433 |
| 6,381,465 | B1 * | 4/2002 | Chern et al. | 455/466 |
| 6,539,393 | B1 * | 3/2003 | Kabala | 707/102 |
| 6,549,768 | B1 * | 4/2003 | Fraccaroli | 455/456.3 |
| 6,647,257 | B2 * | 11/2003 | Owensby | 455/414.1 |
| 6,697,949 | B1 * | 2/2004 | Philyaw et al. | 713/201 |
| 6,845,361 | B1 * | 1/2005 | Dowling | 705/5 |
| 6,873,850 | B2 * | 3/2005 | Dowling et al. | 455/456.1 |
| 2002/0171581 | A1 * | 11/2002 | Sheynblat et al. | 342/357.09 |
| 2004/0203878 | A1 * | 10/2004 | Thomson | 455/456.1 |
| 2007/0191026 | A1 * | 8/2007 | Teplitsky | 455/456.3 |

FOREIGN PATENT DOCUMENTS

| | | | |
|---|---|---|---|
| DE | 0021060 | A1 | 7/1981 |
| DE | 40 33 054 | A1 | 4/1992 |
| FR | 2596902 | | 10/1987 |
| FR | 2719931 | | 11/1995 |
| WO | WO 99/35778 | * | 7/1999 |

* cited by examiner

*Primary Examiner*—Ajit Patel
*Assistant Examiner*—Khai M Nguyen
(74) *Attorney, Agent, or Firm*—King & Spalding L.L.P.

(57) ABSTRACT

A method for transmission of location-specific information is described. Content transmitters are positioned at different locations and information which is specific for this location is stored in a content memory for each content transmitter. Each content transmitter transmits this location-specific information in a spatially narrowly bounded transmission area. On entering the transmission area, a mobile receiving unit receives the location-specific information, processes it further and causes it to be displayed.

14 Claims, 1 Drawing Sheet

METHOD FOR TRANSMISSION OF LOCATION-SPECIFIC INFORMATION

BACKGROUND OF THE INVENTION

The present invention relates to a method for transmission of location-specific information, an information transmission system and to its components for carrying out the method.

Until now, local information, such as information which is dependent on the location and is specific to that particular location has largely been communicated via the so-called classic media. These include, for example, posters, shop windows, promotions by commercial organizations or, for a relatively large coverage area, advertising on the radio, on television, as well as notices in newspapers and journals. Initial approaches have been made to set up large super-regional databanks for dissemination of such location-specific information via more modern media, such as the Internet. In these databanks, location-dependent information, which is provided by so-called content providers, is cataloged, stored and made available to customers on the basis of the contents and the physical dependencies of such information. However, the effort for setting up and maintaining such central databanks is very high. Furthermore, a large amount of information which is provided by the individual content providers is relevant only within a very narrow area around the respective source of the information, as is the case, for example, for prices, in particular special offers at a supermarket or a daily menu for a restaurant.

SUMMARY OF THE INVENTION

One advantage of the present invention is that it provides a simple and cost-effective method for the transmission of location-specific information.

One embodiment of the present invention is a method in which a content transmitter is in each case positioned at different locations and information which is specific for this location is stored in a content memory for each content transmitter. Each content transmitter transmits this location-specific information in a spatially narrowly bounded transmission area. On entering the transmission area of a content transmitter, a mobile receiving unit automatically receives the location-specific information, processes it further, and causes it to be displayed.

In a preferred embodiment, a "content transmitter" may be a unit for generating and/or storing and for automatic transmission of the respective information contents. Content transmitters can be installed by the respective content providers at any desired position. Depending on the choice of the transmission areas, they generally transmit the information in an area of a few meters or, if a more powerful transmitter is chosen, in an area of about 100 meters around the location, as a maximum. As soon as someone with an appropriate receiving unit enters the transmission area of the respective content transmitter, the information is received from the output unit, is further processed, and may be output.

In this decentralized system according to the present invention for automatic transmission of location-specific contents from the various content transmitters, no central information points or databanks whatsoever are any longer required for administration of the various contents. The location-specific information is administered by the respective content transmitters where it is produced and also required. There is no longer any need for further processing, in particular sorting on the basis of the location.

The flexibility of the system results in a very wide variety of possible applications.

Possible areas of use can be found, for example, in or in front of restaurants for transmitting the menu to the arriving guests, or else to those walking or driving past the restaurant. Such content transmitters can also be set up for supermarkets or other businesses, in order to inform of what is being offered by these businesses, in particular special offers. Furthermore, such appliances can be put up on notice boards in order to provide the viewer with information in addition to what is on the respective notice. Further application examples include tourist sights, at which the content transmitters in each case transmit information about that tourist sight, and up to date announcements in train stations or at airports etc. A further field of application is, for example, for use on road signs, in particular for transmitting additional warning information to corresponding receiving units in vehicles. It is likewise possible in this way to provide help to those who are blind or who are visually impaired while they are walking, provided an appropriate audible output is provided on the receiving unit.

In one preferred embodiment of the present invention, the content transmitters first of all transmit a readiness signal. This readiness signal is received by the receiving unit on entering the transmission area of the content transmitter, and the receiving unit then transmits an inquiry signal. The content transmitter does not transmit the information to the receiving unit again until this inquiry signal has been received. This embodiment of the present invention makes it possible for the receiving unit to transmit an authorization signal in order to check the information, and for this authorization signal to be checked by the content transmitter before transmission of the information. This makes it possible to ensure that only authorized users receive the information. In another embodiment of the present invention, authorization to receive the information may be coupled to the payment of a fee for use of the system. In other embodiments of the present invention, authorization may likewise be made dependent on other conditions. For example, the system can be set up such that young people do not receive any information whatsoever about alcohol or tobacco.

In yet other embodiments of the present invention, the information to be transmitted can be in encoded form by the content transmitter, and for the information to be decoded by the receiving unit by means of an appropriate key, in which case the provision of an appropriate key can once again be made dependent on the payment of a fee.

Furthermore, it is one advantage of the present invention for the information which is emitted by the content transmitter to be filtered before being output or displayed by the receiving unit. This may be done, inter alia, in the two different ways mentioned below:

In one embodiment of the present invention, the receiving unit transmits an inquiry signal, which checks only specific information contents. In this context it is possible, in particular, for the content transmitter to transmit, for example together with the readiness signal, a directory relating to the available location-specific information, so that the receiving unit does not transmit any inquiry signal at all unless there is a corresponding match between the chosen information and the offered information.

This bidirectional communication between a content transmitter and a receiving unit can also be extended such that the content transmitter offers additional information and the user uses the receiving unit to check this additional information, or the receiving unit automatically checks this additional information once it has been set up appropriately. Furthermore, if it is connected to appropriate accessories, for example a computer or cash register system at a sales point or in a restaurant, the content transmitter can receive and pass on an order signal from the receiving unit. In this way, the receiver of information about goods on offer can immediately order or reserve the goods as required.

In another embodiment of the present invention, the receiving unit itself has a filter device, so that the receiving unit can receive all the location-specific information and then filters it as a function of the prerequisites stored in the receiving unit by a user.

The receiving unit expediently has an appropriate input device by means of which filter data can be entered on the basis of which the location-specific information is filtered in the receiving unit itself, or an appropriate selective inquiry signal is produced for transmission to the content transmitter. This input device may be a keypad or a display, with the filter device or the device for generation of the inquiry signal being programmed under normal menu control. This may also comprise a voice input, of course.

Since the user can select the desired type of information, this ensures that the user does not miss any offers of interest while, on the other hand, he is also not bothered by unnecessary offers. In one embodiment of the present invention, if the user is looking for a specific item or for a specific restaurant, a beer garden or the like, he can select this requirement on his appliance such that the appliance automatically notifies him of corresponding offers as soon as he is passing somewhere where this offer is available.

Both the content transmitter and the receiving device in preferred embodiments of the present invention have a voltage supply which is independent of the mains power supply system.

The power supply is preferably provided by batteries, rechargeable batteries or, possibly, solar cells. When fitted in a vehicle, a connection can also be provided to the vehicle power supply, that is to say to the vehicle battery or generator.

In other embodiments of the present invention, the content transmitters can also be connected to a main power supply system voltage, as fixed-position appliances. This can be done in particular when such appliances are used in businesses, restaurants or the like. When using such content transmitters at locations where no main power supply system connection is easily available, for example on notice boards, traffic signs or the like, it is worthwhile to provide an autonomous supply using solar cells and rechargeable batteries.

The content memory should preferably be a nonvolatile memory to prevent the information from being erased in the event of a brief failure of the voltage supply.

A normal mobile terminal can preferably be used as the receiving unit, for example a mobile telephone or a PDA, which is equipped with an appropriate apparatus for reception, for example a short-range radio interface, and with devices for processing and for outputting the information. With appropriately compressed technology, the mobile terminal may even be a watch.

A so-called "Bluetooth" model, which is able to communicate bidirectionally via a 2.4 gigahertz channel, may be used as the short-range radio interface, both for the receiving unit and for the content transmitter. This bidirectional interface is in consequence a transmitting/receiving unit via which the location-specific information as well as all the signals required for the communication process, such as a readiness signal, the contents list, an authorization signal, a selective inquiry signal etc., can be received and transmitted. Depending on the module type, the range varies from about 10 meters to a maximum of around 100 meters.

Other short-range interfaces, such as infrared interfaces, may, of course, also be used. However, these interfaces have the disadvantage that these interfaces must be aligned with one another by the user. This means that the user must himself first of all know where a corresponding transmitter is located, and that he must then deliberately point his receiver at the transmitter in order to transfer the information.

Furthermore, another advantage of the present invention is that on entering the transmission area of a content transmitter with the desired information, for the receiving unit to indicate this by an audible or visual signal, a vibration signal or the like.

Additional features and advantages of the present invention are described in, and will be apparent from, the following Detailed Description of the Invention and the Figures.

DETAILED DESCRIPTION OF THE INVENTION

Figure 1:
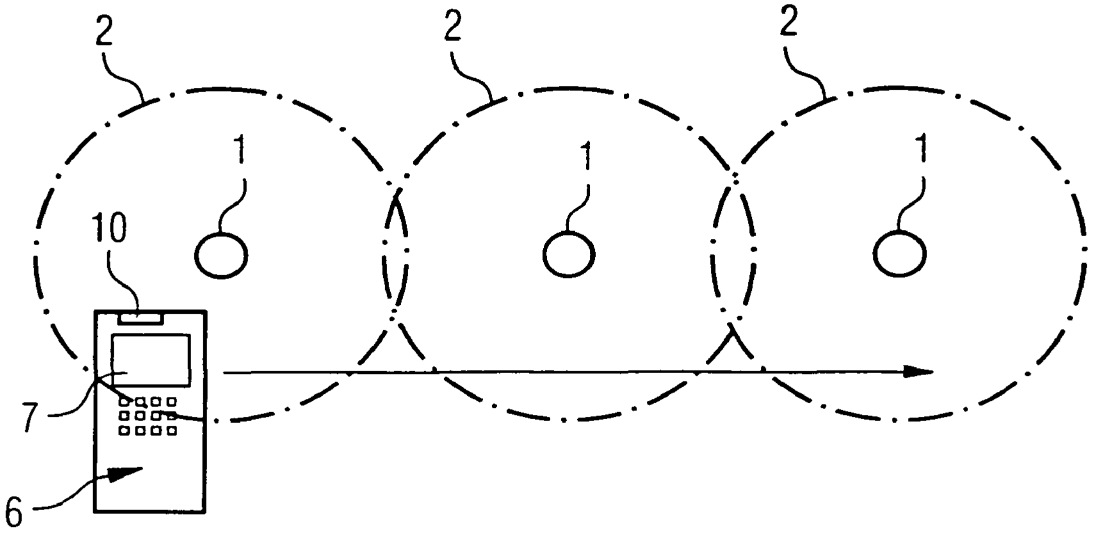
FIG. 1 shows a schematic illustration of a receiving unit which is moving through the transmission areas of a number of mutually adjacent content transmitters.

In one embodiment of the present invention, as shown in FIG. 1, content transmitters 1 are positioned at various locations and transmit different information contents which are specific to the respective location. These content transmitters 1 use an appropriate radio interface 3, for example a "bluetooth" module, to transmit their information within a narrowly bounded transmission area 2.

A customer or user of the system carries a receiving unit 6 with him, which is equipped with an appropriate short-range module 10. As soon as the receiving unit 6 enters the transmission area 2 of a content transmitter 1, it can receive the information transmitted by the respective content transmitter 1, and can output it on the display 7.

Figure 2:
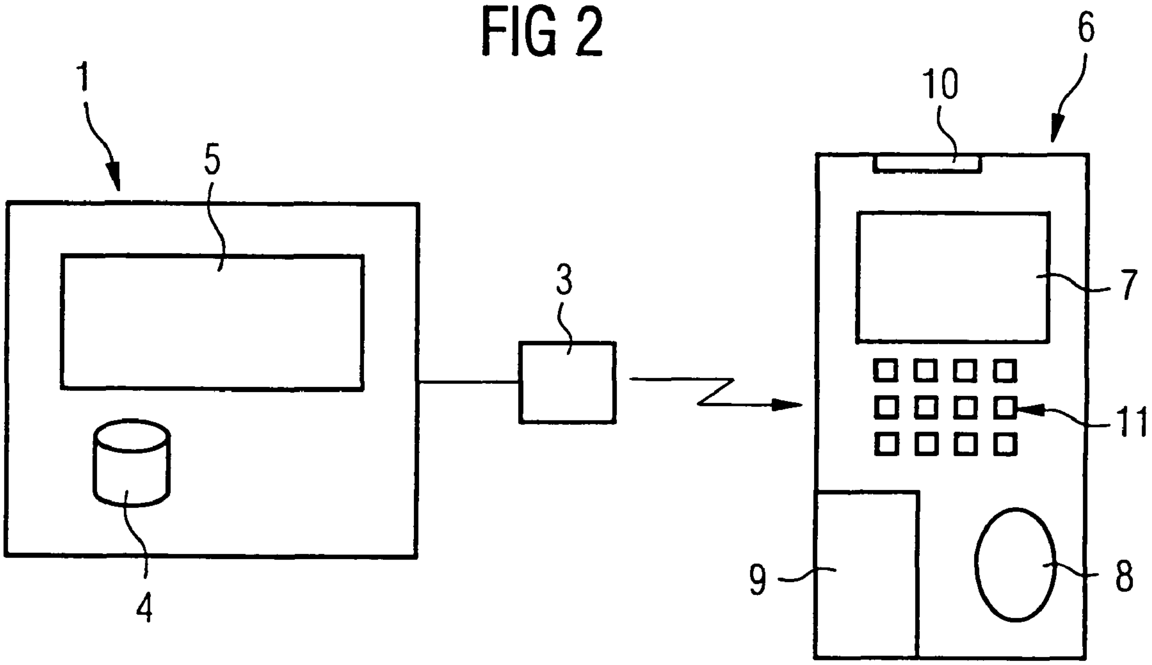
FIG. 2 shows a schematic illustration of a content transmitter and of a receiving unit.

As illustrated in another embodiment of the present FIG. 2, the content transmitter is a unit for generation of information by means of an input apparatus 5, and for storage of the information in a content memory 4. The data stored there is transmitted by the content transmitter 1 automatically via a radio interface 3. Instead of the input unit 5, the content transmitter 1 may also have an interface for storing the information contents in the memory 4, via which interface appropriate information is transmitted, for example by means of a PC.

As can likewise be seen from FIG. 2, it is not absolutely essential for the radio interface 3 and for the other components of the content transmitter 1 to be physically joined together in a unit. Thus, for example, the input unit 5 and/or the interface for transmission of the data to the content memory 4, the content memory and, possibly, further components may be located within a computer system or may be in the form of an autonomous PC, an electronic cash register or the like. This section is connected via a data line to the radio interface 3 which is located, for example, outside the building.

One application example is a computer system within a department store having electronic cash registers, in which system the prices for the individual items are stored, and are updated at any time, in the content memory 1. These prices are transmitted via the interface 3. The user of a receiving unit 6 can in turn use the input unit 11 in conjunction with the display 7 to select a specific inquiry profile in his filter device 9, on the basis of which he is looking for a specific item, below a specific price. If this user together with his input unit 6 now enters the transmission area 2 of the content transmitter 1 in said supermarket, then all the transmitted price information is checked to determine whether the respective item is available below the stated price here. If this is the case, a signal is emitted via the audible output device 8, and the information is displayed in the form of a text on the display 7.

Since, in this system, all the information is stored and administered only where it is produced and required, the overall transmission system is relatively cost-effective and requires little maintenance. The respective cost provider need only ensure that the information offered by him is updated. The output is produced automatically. On the other hand, the receiver of the information can select precisely what information he would like to have in each case, so that he is made aware of all the items that are of interest to him, while at the same time being protected against information which is not of interest to him. To this extent, the overall system is also considerably more effective than the sole use of the previously known classic advertising media such as notices or shop windows, in which a large amount of effort is involved in providing as much awareness as possible to a broad range of the public, in order to cover the actual target group as well as possible. In contrast, in the present invention, only that target group which is interested in the respective product is addressed, and this is done automatically.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. A method for transmission of location-specific information by a plurality of content transmitters at different physical locations, wherein each of the plurality of content transmitters transmit information including content that is specific to a transmission perimeter surrounding each physical location, the method comprising the steps of:

each content transmitter transmitting (a) location-specific information in a spatially narrowly bounded transmission area, and (b) a content list relating to the location-specific information, the content transmitter transmitting the content list together with a readiness signal receivable by a mobile receiving unit on entering the transmission area of the content transmitter;

after receiving the content list from the content transmitter, the receiving unit sends transmitting an inquiry signal only if information in the content list matches predetermined desired information identified by the receiving unit;

after receiving the inquiry signal, the content transmitter transmitting location-specific information to the mobile receiving unit; and the mobile receiving unit receiving the location-specific information, and filtering the content of the location-specific information to allow only certain content to be processed by the mobile receiving unit.

2. The method of claim 1, wherein the mobile receiving unit transmits an authorization signal which is checked by the content transmitter before transmission of the information.

3. The method of claim 1, wherein the mobile receiving unit filters the received location-specific information as a function of prerequisites stored in the mobile receiving unit.

4. The method of claim 1, wherein the location-specific information is transmitted in encoded form by the content transmitter and is decoded by the mobile receiving unit via an appropriate key.

5. The method of claim 1, wherein the mobile receiving unit includes a mobile terminal with a short-range wire-free interface.

6. A content transmitter, comprising:

a content memory;

a short range transmitter for transmission of (a) location-specific information including content that is specific for an area surrounding the transmitter, and (b) a content list relating to the location-specific information;

a further transmitter for transmitting the content list together with a readiness signal to a receiving unit upon the mobile receiving unit entering a transmission area of the content transmitter;

a receiving section for receiving an inquiry signal from the receiving unit after sending the content list to the receiving unit if information in the content list received by the receiving unit matches predetermined desired information identified by the receiving unit; and a device which selects and transmits to the receiving unit location-specific information from the content memory on receiving the inquiry signal from the receiving unit, the device having a filter which filters the content of the location-specific information as a function of the inquiry signal, before transmitting the location-specific information to the receiving unit.

7. The content transmitter of claim 6, further comprising a checking device which checks an authorization signal transmitted by a receiving unit before transmission of the location-specific information.

8. The content transmitter of claim 6, further comprising an encoder for encoding the transmitted location-specific information.

9. The content transmitter of claim 6, further comprising a voltage supply system which is independent of a main power supply system.

10. A receiving unit, comprising:

a short-range interface configured for:

reception of (a) location-specific information that are transmitted by a content transmitter, and (b) a readiness signal together with a content list relating to the location-specific information, said location-specific information containing data that is specific to an area surrounding the interface, the short-range interface receiving the content list together with a readiness signal from the content transmitter unit upon the receiving unit entering the transmission area of the content transmitter;

transmitting an inquiry signal to the content transmitter only if information in the content list received by the receiving unit matches predetermined desired information identified by the receiving unit;

reception of location-specific information from the content transmitter, the location-specific information being transmitted to the receiving unit in response to the inquiry signal from the receiving unit;

a device for further processing of received location-specific information;

a display device for displaying the location-specific information; and a filter device included in the processing device which filters the received location-specific information.

11. The receiving unit of claim 10, further comprising a further transmitter for transmitting an inquiry signal on receiving the readiness signal for the content transmitter.

12. The receiving unit of claim 10, further comprising an input device for inputting filter data which the received location-specific information is filtered in the receiving unit and the selective inquiry signal is produced for transmission to the content transmitter.

13. The receiving unit of claim 10, wherein the receiving unit includes a mobile terminal.

14. An information transmission system for transmission of location-specific information, the information transmission system comprising:

a plurality of content transmitters positioned at different locations with each content transmitter transmitting (a) location-specific information including data that is specific for an area surrounding each content transmitter in a spatially narrowly bounded, separate transmission area, and (b) a content list relating to the location-specific information;

a receiving unit which on entering the transmission area of a content transmitter, receives the content list from the content transmitter and, after receiving the content list, sends an inquiry signal to the content transmitter only if information in the content list matches predetermined desired information identified by the receiving unit, wherein in response to receiving the inquiry signal from the receiving unit, the content transmitter transmits location-specific information to the mobile receiving unit, and wherein the receiving unit receives the location-specific information transmitted from the content transmitter, and further processes the location-specific information to filter the data of the received location-specific information and further causes the filtered location-specific information to be displayed.

* * * * *